United States Patent [19]

Takemura et al.

[11] 3,851,693

[45] Dec. 3, 1974

[54] RADIAL TIRE

[75] Inventors: Satoshi Takemura; Katsuyuki Harakon; Mitsuaki Maeda; Noboru Sakai; Etsuko Hamano, all of Tokyo, Japan

[73] Assignee: Bridgestone Tire Company Limited, Tokyo, Japan

[22] Filed: Dec. 18, 1973

[21] Appl. No.: 425,904

[30] Foreign Application Priority Data
Dec. 29, 1972  Japan.................................. 48-3222

[52] U.S. Cl........ 152/361 DM, 152/330 R, 152/357
[51] Int. Cl............................................... B60c 9/22
[58] Field of Search.... 152/330 R, 357, 359, 361 R, 152/361 DM

[56] References Cited
UNITED STATES PATENTS

| | | | |
|---|---|---|---|
| 3,554,260 | 1/1971 | Shoemaker | 152/361 R |
| 3,559,714 | 2/1971 | Verdier | 152/361 DM |
| 3,627,013 | 12/1971 | Chase | 152/361 R |
| 3,669,173 | 6/1972 | Young | 152/361 R |
| 3,692,080 | 9/1972 | Boileau | 152/361 DM |
| 3,717,190 | 2/1973 | Boileau | 152/361 DM |
| 3,757,843 | 9/1973 | Carr | 152/361 DM |
| 3,763,912 | 10/1973 | Bergomi et al. | 152/361 DM |

Primary Examiner—Drayton E. Hoffman
Attorney, Agent, or Firm—Sughrue, Rothwell, Mion, Zinn & Macpeak

[57] ABSTRACT

A radial tire using a composite layer composed of a steel cord layer and an aromatic polyamide fiber cord layer as a breaker. The radial tire is excellent in the corrosion resistance, cushionability, tread wear resistance, high speed performance and cornering performance.

3 Claims, No Drawings

RADIAL TIRE

The present invention relates to a radial tire reinforced with a carcass having cords arranged in a direction perpendicular to the circumferential direction of the tire and with a breaker surrounding the carcass, and having a tread portion, a pair of side portions extending to both the shoulders of the tread portion and a pair of bead portions formed on each inner periphery of the side portions. More particularly, the present invention relates to a radial tire having an improved property, in which steel cords and aromatic polyamide fiber cords are used in the breaker.

Conventional radial tires using steel cords in the breaker are remarkably superior in the tread wear resistance and cornering performance of radial tires using synthetic fiber cords, such as rayon cord, vinylon cord and the like, in the breaker. Because, the initial modulus of steel cord is higher than that of synthetic fiber cords, such as rayon cord, vinylon cord and the like.

However, in the conventional radial tire using steel cords in the breaker, when the tread portion is damaged by obstacles on the road and rain water and the like are penetrated into the tread portion from the outside, the steel cords are rusted rapidly to cause breakage of the tire. In order to prevent this drawback, a synthetic fiber cord layer of polyester or nylon is arranged between the steel cord layer and the tread portion. Furthermore, in the conventional radial tire using steel cords in the breaker, the cushionability between the breaker and the carcass is poor due to the very high initial modulus of steel cords. In order to improve this drawback, a synthetic fiber cord layer of polyester or nylon is arranged between the steel cord layer and the carcass. However, in the conventional radial tire using steel cords in the breaker and provided with a synthetic fiber cord layer of polyester or nylon, the rusting of the steel cord can be prevented and the poor cushionability can be improved, but the tread wear resistance and cornering performance inherent to the radial tire using steel cords in the breaker are decreased.

The object of the present invention is provide a radial tire, in which the corrosion of steel cord due to penetration of rain water is prevented and the cushionability between the breaker and the carcass is improved without decreasing the tread wear resistance and the cornering performance inherent to the radial tire using steel cords in the breaker.

The present invention consists in a radial tire reinforced with a carcass having cords arranged in a direction perpendicular to the circumferential direction of the tire and with a breaker surrounding the carcass, and having a tread portion, a pair of side portions extending to both the shoulders of the tread portion and a pair of bead portions formed on each inner periphery of the side portions, characterized in that said breaker is composed of a composite layer consisting of a metal cord layer, in which steel cords are embedded in parallel in a rubber having a 300 percent modulus of 150 – 250 Kg/cm$^2$ at an angle of 5° – 25° against the circumferential direction of the tire, and a fiber cord layer, in which aromatic polyamide fiber cords having a tenacity of more than 10 g/d, an initial modulus of more than 150 g/d and a twisting coefficient of cable twist of 0.10 – 0.60 and that of ply twist of 100 – 200 percent based on the cable twist, said twisting coefficient being represented by the following formula:

$$NT = N \times \sqrt{0.139 \times D/\rho} \times 10^{-3}$$

wherein NT is twisting coefficient, N is number of twists per 10 cm of the cord, D is one-half of total deniers of the cord and $\rho$ is specific gravity of the fiber, are embedded in parallel in a rubber having a 300 percent modulus of 130 – 250 Kg/cm$^2$ at an angle of 0° – 45° against the circumferential direction of the tire.

The aromatic polyamide to be used in the fiber cord of the present invention has amide linkage and aromatic group in the molecule and is represented by the following general formulae:

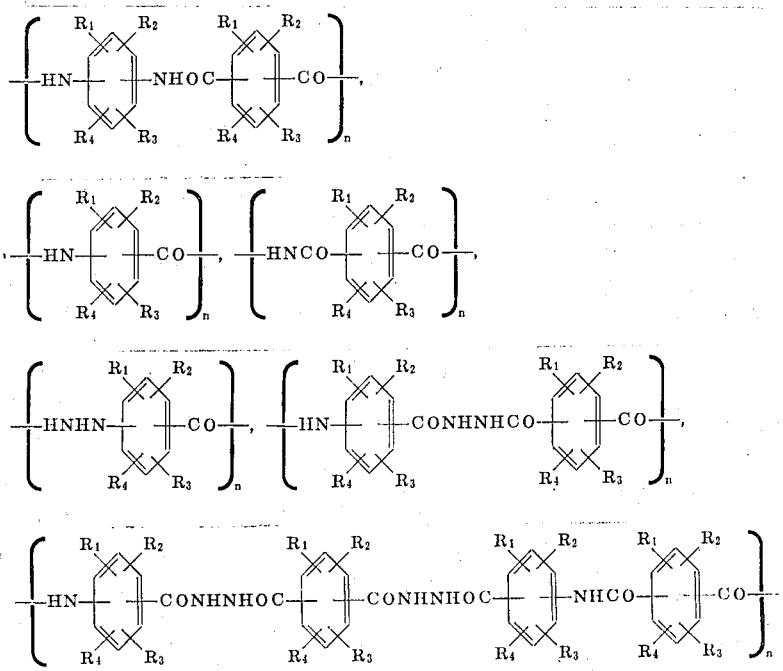

wherein $R_1$, $R_2$, $R_3$ and $R_4$ are hydrogen, halogen and hydrocarbon residues.

The fiber cord to be used in the present invention has a tenacity of more than 10 g/d, preferably more than 15 g/d, and an initial modulus of more than 150 g/d, preferably more than 200 g/d.

When a plurality of aromatic polyamide fibers are twisted to produce a cord, if the twisting coefficient is too low, the resulting cord has a considerably poor sizing property, and the adhesive does not penetrate uniformly between the fibers. As the result, the cord is apt to be separated from rubber during the running of tire, and the fatigue resistance of the cord is considerably decreased. While, when the twisting coefficient is too high, the resulting cord has considerably low modulus and tenacity.

The twisting coefficient of the cord to be used in the present invention is represented by the following formula $$NT = N \times \sqrt{0.139 \times D/\rho} \times 10^{-3}$$

wherein $NT$ is twisting coefficient, $N$ is number of twists per 10 cm of the cord, $D$ is one-half of total deniers of the cord and $\rho$ is a specific gravity of the fiber and the twisting coefficient of the cable twist is 0.10 – 0.60 and that of the ply twist is 100 – 200 percent based on the cable twist, and the twisting coefficient of the cable twist is preferred to be 0.25 – 0.45.

The rubber to be used for embedding steel cords or the aromatic polyamide fiber cords is required to have an initial modulus higher than the rubber to be used for embedding conventional synthetic fiber cords. Because, both steel cords and the aromatic polyamide fiber cords have a high initial modulus, and therefore if the modulus of the rubber is not high, tires having sufficiently high tire performances can not be obtained.

The rubber for embedding steel cords has a 300 percent modulus after vulcanization of 150 – 250 Kg/cm².

The rubber for embedding the aromatic polyamide fiber cords has a 300 percent modulus after vulcanization of 130 – 250 Kg/cm², preferably 160 – 250 Kg/cm².

According to the present invention, it has been found that the use of the particularly defined cord layers as mentioned above for the breaker in the radial tires provides radial tires having improved tire performances, particularly corrosion resistance, cushionability, tread wear resistance and cornering performance.

The following example is given for the purpose of illustration of this invention and is not intended as limitations thereof.

EXAMPLE

As the aromatic polyamide fiber cords to be used in the radial tire of the present invention, polyparaphenylene terephthalamide fiber cords were used for a breaker, and radial tires were prepared as follows, and the tread wear resistance, cornering performance, cushionability and high speed performance were determined.

Cord (a):
tenacity: 13 g/d
initial modulus: 170 g/d
twisting coefficient of cable twist: 0.55
twisting coefficient of ply twist: 0.55
1,600 d/2

Cord (b):
tenacity: 18 g/d
initial modulus: 400 g/d
twisting coefficient of cable twist: 0.38
twisting coefficient of ply twist: 0.38
1,600 d/2

Tire size:
175-14, 2 ply layers,
3 breaker layers

Angle of carcass cords:
90° against the circumferential direction of tire

Angle of breaker cords:
Steel cords: 15° against the circumferential direction of tire
Synthetic fiber cords: 32° against the circumferential direction of tire 1. Test tires
  a) Tire A (Present invention):
  As the breaker, a composite layer composed of two steel cord layers, each of which was produced by embedding steel cords of 1×5 (diameter of steel is 0.25 mm) in a rubber having a 300 percent modulus of 170 Kg/cm², and one fiber cord layer, which was produced by embedding the cords (a) in a rubber having a 300 percent modulus of 150 Kg/cm² and arranged between the steel cord layer and the tread portion, was used. As the carcass, a ply having polyester fiber cords of 1,300 d/2 was used.

b) Tire B (Present invention):
  As the breaker, a composite layer composed of the same steel cord layers as used in the tire A and one fiber cord layer, which was produced by embedding the cords (b) in a rubber having a 300 percent modulus of 180 Kg/cm² and arranged between the steel cord layer and the tread portion, was used. As the carcass, a ply having polyester fiber cords of 1,300 d/2 was used.

c) Tire C (Present invention):
  As the breaker, a composite layer composed of the same steel cord layers as used in the tire A and one fiber cord layer, which was produced by embedding the cords (a) in a rubber having a 300 percent modulus of 150 Kg/cm² and arranged between the steel cord layer and the carcass, was used. As the carcass, a ply having nylon-66 fiber cords of 1,050 d/2 was used.

d) Tire D (Comparative tire):
  As the breaker, a composite layer composed of two steel cord layers, each of which was produced by embedding steel cords of 1×5 (diameter of steel is 0.25 mm) in a rubber having a 300 percent modulus of 135 Kg/cm², and one fiber cord layer, which was produced by embedding the cords (a) in a rubber having a 300 percent modulus of 115 Kg/cm² and arranged between the steel cord layer and the tread portion, was used. As the carcass, a ply having polyester fiber cords of 1,300 d/2 was used.

e) Tire E (Conventional tire):
  As the breaker, a composite layer composed of two steel cord layers, each of which was produced by embedding steel cords of 1×5 (diameter of steel is 0.25 mm) in a rubber having a 300 percent modulus of 170 Kg/cm², and one layer having rayon cords of 1,650 d/2, which was arranged between the steel cord layer and the tread portion, was used. As the carcass, a ply having polyester fiber cords of 1,300 d/2 was used.

f) Tire F (Conventional tire):
  The same layers as used in the tire E were used. However, the rayon cord layer was arranged between the steel cord layer and the carcass.

g) Tire G (Comparative tire):
  As the breaker, the same steel cord layers as used in the tire A were used alone. As the carcass, the same ply having polyester fiber cords as used in the tire A was used.

2. Test methods a) Tread wear resistance:

A road test was effected under the following condition:

Load per 1 tire: about 400 Kg
Internal pressure of tire: 2.0 Kg/cm²
Average speed: about 40 Km/hr
Road: good city road After 40,000 Km running, the tread wear was measured.

b) Cornering performance:

The cornering performance of tire is represented by the cornering force. When a slip angle is given to a tire, the car naturally begins to turn and a centrifugal force is produced by the turning movement. The cornering force is a force which is caused by a frictional force between the tire and the road surface against the centrifugal force in a direction perpendicular to the rotating plane of the tire. The higher cornering force means the better cornering performance. The cornering force was measured by means of a drum tester.

c) Cushionability:

The cushionability influences the ride feeling. A car having the better cushionability has the more excellent ride feeling. A feeling test was made by a test driver.

d) High speed performance:

The high speed performance was measured by running a car on a drum tester under a given load for a given time and then the speed was increased step by step, and the time and speed when the tire was broken were measured.

3. Test results

The test results are shown in the following Table 1.

The tread wear resistance, cornering performance and high speed performance are shown by the index based on the measured value of the Tire E (conventional) of 100. The larger index means the better property.

As seen from Table 1, the tire of the present invention is remarkably superior to conventional tire in the tread wear resistance and cornering performance. Further the tire of the present invention is substantially the same as the tire, which uses steel cord layer alone in the breaker, in the tread wear resistance and cornering performance, but is remarkably superior in the cushionability and high speed performance.

What is claimed is:

1. A radial tire reinforced with a carcass having cords arranged in a direction perpendicular to the circumferential direction of the tire and with a breaker surrounding the carcass, and having a tread portion, a pair of side portions extending to both the shoulders of the tread portion and a pair of bead portions formed on each inner periphery of the side portions, characterized in that said breaker is composed of a composite layer consisting of a metal cord layer, in which steel cords are embedded in parallel in a rubber having a 300 percent modulus of 150 – 250 Kg/cm² at an angle of 5° – 25° against the circumferential direction of the tire, and a fiber cord layer, in which aromatic polyamide fiber cords having a tenacity of more than 10 g/d, an initial modulus of more than 150 g/d and a twisting coefficient of cable twist of 0.10 – 0.60 and that of ply twist of 100 – 200 percent based on the cable twist, said twisting coefficient being represented by the following formula:

$$NT = N \times \sqrt{0.139 \times D/\rho} \times 10^{-3}$$

wherein NT is twisting coefficient, N is number of twists per 10 cm of the cord, D is one-half of total deniers of the cord and $\rho$ is specific gravity of the fiber, are embedded in parallel in a rubber having a 300 percent modulus of 130 – 250 Kg/cm² at an angle of 0° – 45° against the circumferential direction of the tire.

2. The radial tire as claimed in claim 1, wherein the aromatic polyamide fiber cord has a tenacity of more than 15 g/d, an initial modulus of more than 200 g/d and the twisting coefficient of cable twist is 0.25 – 0.45.

3. The radial tire as claimed in claim 1, wherein the rubber for embedding the aromatic polyamide fiber cords has a 300 percent modulus of 160 – 250 Kg/cm².

Table 1

| Test tire | A | B | C | D | E | F | G |
|---|---|---|---|---|---|---|---|
| Test results | Present invention | | | Comparative | Conventional | Conventional | Comparative |
| Tread wear resistance | 130 | 130 | 125 | 120 | 100 | 105 | 125 |
| Cornering performance | 130 | 135 | 120 | 105 | 100 | 100 | 130 |
| Cushionability | somewhat good | somewhat good | good | somewhat good | somewhat good | good | bad |
| High speed performance | 110 | 115 | 110 | 105 | 100 | 100 | 95 |

* * * * *